Aug. 31, 1926.
A. I. FERRIER
1,597,875
ROLL SPREADER
Filed Dec. 31, 1925
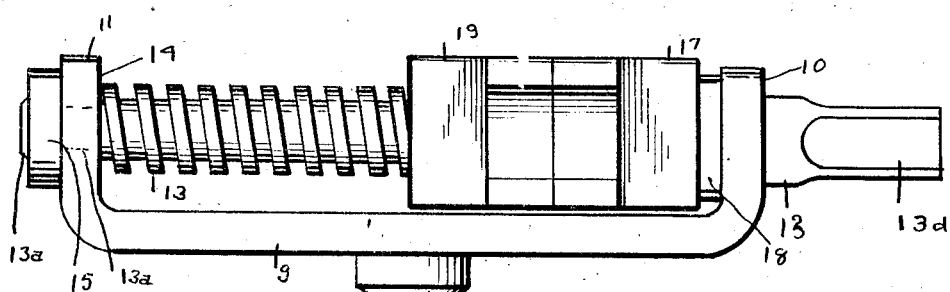
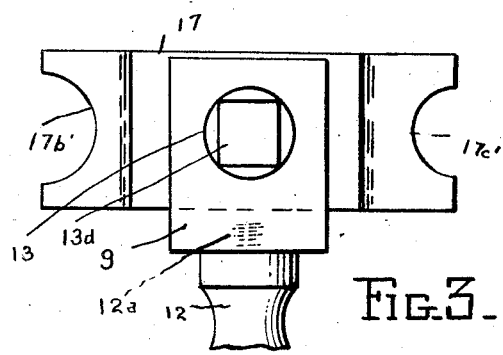
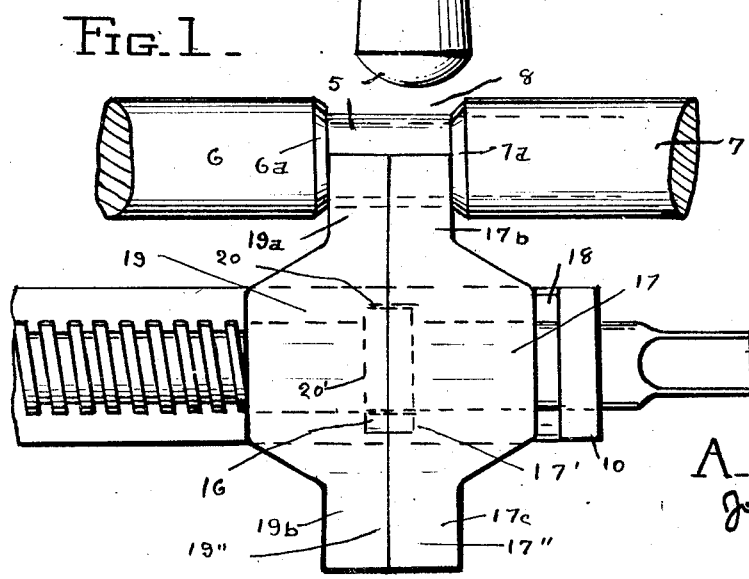
INVENTOR
A. I. FERRIER
Joseph J. O'Brien
ATTORNEY Patented Aug. 31, 1926.

1,597,875

UNITED STATES PATENT OFFICE.

ALEXANDER INNES FERRIER, OF LUDLOW, MASSACHUSETTS.

ROLL SPREADER.

Application filed December 31, 1925. Serial No. 78,717.

This invention relates to improvements in devices for spreading rolls mounted upon a common shaft, and its leading object is to provide a device of this character which may be applied to rolls upon a long and heavy shaft and operated in such manner that great pressure will be applied against the opposing ends of the rolls, without danger of chipping the corners of rollers or otherwise mutilating the same, as by distorting the rolls, by expanding their bores or deforming their normal cylindrical shapes.

Another object of the invention is to provide a device of this character which may be manufactured economically and which will continue to give satisfactory service in use.

With the above and other objects in view the invention comprises certain new and useful constructions, combinations and arrangements of parts, clearly described in the following specification and fully illustrated in the accompanying drawings, in which:—

Fig. 1 is a plan view showing the improved machine tool applied in working position.

Fig. 2 is a side elevation of the device.

Fig. 3 is an end elevation thereof.

Referring to the accompanying drawings illustrating the practical embodiment of my invention 5 designates a shaft on which the rolls 6 and 7 are mounted, with the opposing bevelled ends 6$^a$ and 7$^a$ thereof spaced apart and providing the usual gap 8.

My improved spreading tool consists of the steel yoke 9, the right angular end portions of which provide bearings 10 and 11. A handle 12 is connected to the central portion of the yoke by means of the screw joint 12$^a$, or in any other approved manner. The operating screw 13 extends through the bearing 10 and has a reduced end portion 13$^a$ which extends through the bushing 14 in the bearing 11. A nut 15 is threaded on said reduced end portion against the bearing 11 to hold the screw in operating position.

The screw 13 is provided with an integral or other shoulder 16 which bears against the inner wall 17′ of the recess 17$^a$ of the pressure block 17, which is provided with outwardly extending jaws 17$^b$ and 17$^c$ to engage the ends of the rolls to be acted upon. The pressure block is centrally reduced and bears against the washer 18 located between the pressure block and the bearing 10.

A movable pressure block 19 has threaded engagement with the operating screw 13, and is formed with oppositely extending jaws 19$^a$ and 19$^b$, corresponding to the jaws 17$^b$ and 17$^c$. The integral shoulder 16 of the screw 13 also bears against the wall 20′ of the recess 20 formed in the block 19, so that the opposing inner faces 17″ and 19″ may be brought into meeting engagement, thus increasing the total length of the stroke of the movable jaw.

The jaws 17$^b$ and 17$^c$ are formed with arcuate end faces 17$^{b′}$ and 17$^{c′}$, and the jaws 19$^a$ and 19$^b$ are formed with arcuate end faces 19$^{a′}$ and 19$^{b′}$, to fit closely to the shaft to be operated on.

The screw 13 is provided with a squared end 13$^d$, so that the ratchet or other wrench 21 may be applied thereto to turn the screw and force the two pressure blocks apart, so as to separate the ends of the rolls engaged by the jaws of these blocks. Only one side of the tool is ordinarily used at one time.

The jaws extend over the shaft to or beyond the longitudinal center line thereof, and when pressure is applied to the ends of the rolls the rolls will be moved apart on the shaft, without chipping or marring the ends of the rolls, and without deforming the cylindrical surfaces thereof, by expanding the bores of the rolls, with which the shaft has a driven or shrunken fit.

Having described my invention I claim:—

1. A roll spreader consisting of a yoke providing spaced bearings, a shaft mounted to rotate in the bearings and having screw threads for at least a portion of its length, a pressure block through which the shaft extends arranged to bear against one of the bearings, said pressure block having a laterally extending jaw on one side thereof, and a second pressure block having screw threaded engagement with screw threads of said shaft and provided with a laterally extending jaw on one side thereof.

2. A roll spreader consisting of a yoke having end bearings, a shaft having an unthreaded portion extending through one of the bearings and having a bearing on the other bearing, said shaft having screw threads extending from said last named bearing toward the other bearing, a pressure block mounted on the shaft to bear against the first bearing, and a pressure block mounted on the screw threads to be propelled thereby, each pressure block having laterally extending jaws provided with concave end faces.

In testimony whereof I affix my signature.

ALEXANDER INNES FERRIER.